June 26, 1951 H. R. KARLEN 2,558,521
BEVERAGE BREWER
Filed Oct. 23, 1948
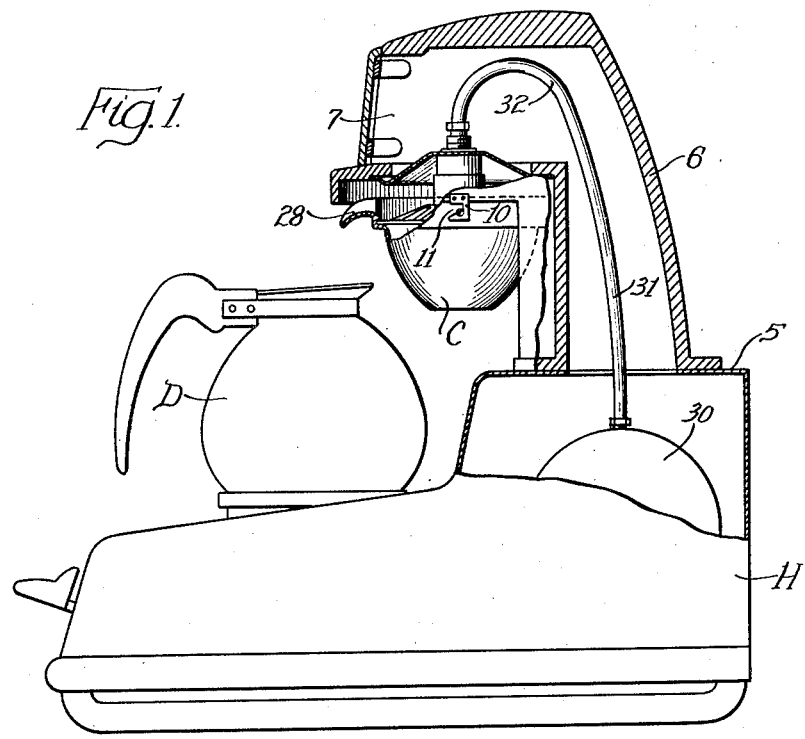
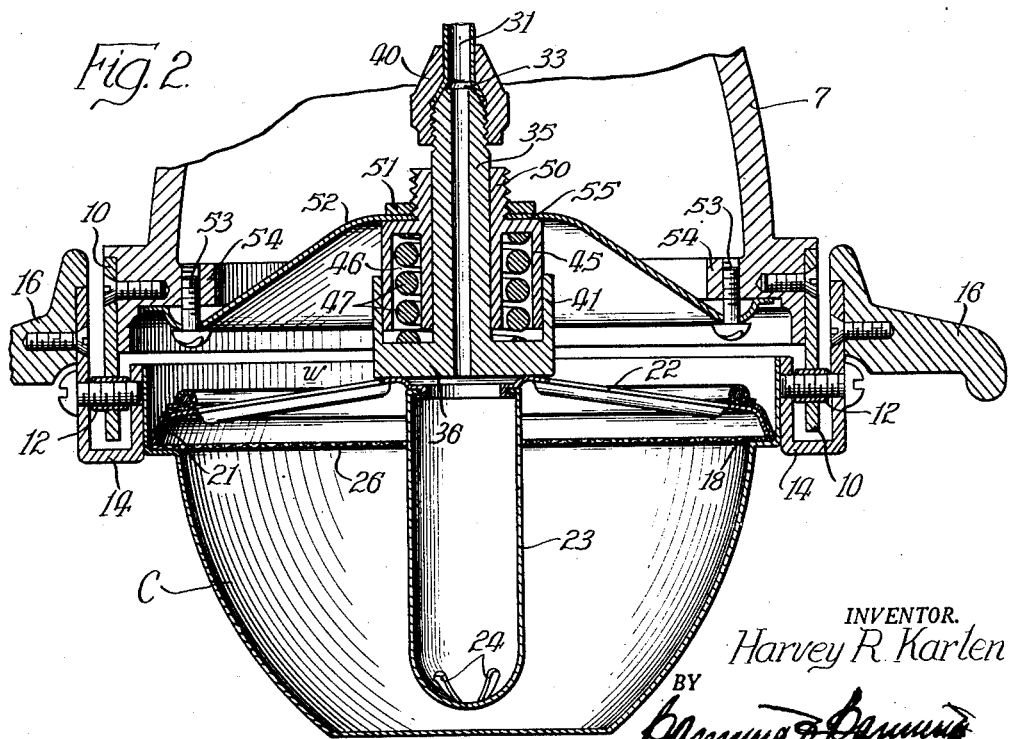
INVENTOR.
Harvey R. Karlen
BY
Attys.

Patented June 26, 1951

2,558,521

UNITED STATES PATENT OFFICE 2,558,521

BEVERAGE BREWER

Harvey R. Karlen, Chicago, Ill., assignor to Cory Corporation, Chicago, Ill., a corporation of Delaware Application October 23, 1948, Serial No. 56,130

7 Claims. (Cl. 99—303)

This invention relates in general to a commercial coffee brewer having means for producing repeated charges of a coffee infusion in quantities sufficient to meet the requirements of many people. More particularly it is concerned with an apparatus of the type wherein a charge of finely ground coffee is contained within a cartridge which is suspended in operative position beneath the discharge end of a delivery duct that leads from a tank containing hot water. It is primarily an object of this invention to provide a sealing but separable connection between the discharge end of such a duct and the filter unit which is positioned across the top of the cartridge.

In the past, various expedients have been resorted to for the purpose of establishing a substantially sealed separable connection between a filter unit at the top of a cartridge containing finely divided coffee and the discharge end of a hot water duct which is positioned thereover. In all such cases certain deficiencies have existed, such as rapid deterioration of a sealing element where rubber is used, imperfect sealing where a bellows type of seal is interposed, etc. While previous constructions of the kinds noted have worked with a fair degree of success, they still leave something to be desired.

According to the present invention I utilize a sealing member which constitutes a fixed extension of the duct, but which is mounted to yield against the pressure of a spring so as to remain tightly engaged with the filter unit of the cartridge when the latter is supported operatively in place. In such a construction the hot water duct is also required to yield with the sealing member. The mounting in which the sealing member is yieldably supported is itself supported upon an immovable head, and relative movement of the parts comprised in the connection is confined to the sealing member.

A suggestive embodiment of this invention is set forth in the accompanying drawing wherein—

Figure 1 is an end elevation of a typical commercial coffee brewer stove of the automatic type, certain of the parts being broken away to exhibit features which are special to this invention; and Fig. 2 is a transverse section through the cartridge and its mounting, taken at right angles to Fig. 1.

The present stove comprises a housing H having a raised rear portion 5 from which upstands a column 6 supporting a forwardly extending head 7 which is open on the under side. Depending from opposite sides of the head is a pair of hangers 10 formed with oppositely facing cam bayonet slots 11 each adapted to receive a roller trunnion 12 which is carried in a bracket 14 that is affixed exteriorly to a bowl-like cartridge C. Associated with these two brackets are outwardly extending handles 16 to facilitate handling of the cartridge.

In its upper region the cartridge is outset at 18, the ledge thus provided defining a cylindrical well w. The ledge also provides a circular support for the marginal flange 21 of a dished spider 22 having a central opening from which depends a tube 23 in whose bottom is a plurality of radially disposed openings 24. Fitted over the spider is a strainer 26 of fabric or the like whose margins are appropriately secured. Through this strainer coffee infusion may pass upwardly into the well portion of the cartridge preliminary to its draining out through a pouring spout 28 at the front thereof. This spider furnishes a frame whereon the strainer is carried, and in conjunction therewith may conveniently be referred to as the filter unit.

Within the housing H is a suitable mechanism forming no part of this invention whereby hot water is admitted, as needed, into a tank 30 where it is heated, and from which it passes outwardly and upwardly through a duct 31 which is disposed within the column 6. At a top point 32 this duct executes a bend which may be as much as 180° or so whereby its delivery end 33 which is outwardly flared is pointed downwardly. Fitted within the delivery end of the duct is the beveled upper end of the tubular body 35 which upstands from a sealing head 36. Screw threaded to the upper end of the tubular body 35 is a coupling nut 40 whose internal contour follows that of the duct at this point. When the coupling nut is tightened upon the tubular body 35 the flared delivery end 33 of the duct will be clamped tightly therebetween in unitary relation therewith.

The under side of the sealing head 36 provides a contact face for pressure engagement with the filter unit to establish therewith a seal which extends circularly at the highest point thereon. Circular walls 41 which upstand marginally from the head 36 define an upwardly facing annular chamber which slidingly receives a tubular guide 45 formed with a downwardly facing annular channel 46. Within this guide is positioned a coiled compression spring 47 whose opposite ends bear against the closed ends of the two interfitted channels. The force of the spring tends to push the sealing head 36 downwardly so that its contact face is maintained in pressure engagement with the filter unit therebelow.

The upper end portion of the guide is reduced to form a neck 50 which is externally threaded for coaction with a nut 51. A supporting wall 52, which may be in the form of a truncated coned spider, is marginally connected as by screws 53 to a ledge 54 which is provided at or near the open bottom of the head 7. The upper center region of the supporting wall is flattened at 55 where a central aperture is provided for receiving the neck 50 of the guide. The nut 51 when applied to the neck bears with pressure upon the top 55 of the supporting wall, thereby holding the guide fixedly in place. In some such way as this a fixed support for the guide is provided in the head, centrally thereof, and at an elevation which is about even with its open under face.

Directly below the pouring spout 28 is a decanter D which is rested upon a platform controlling operation of an automatic mechanism whereby flow of the water into the tank 30 is started and stopped according to whether the decanter is empty or nearly full. Whenever a filled decanter is replaced by one which is empty, the operative cycle is initiated so that water will again be admitted into the tank 30 to become heated and then pass outwardly therefrom through the duct 31 and into the cartridge C containing a charge of ground coffee.

Each time the cartridge is filled with finely ground coffee and a filter unit is applied in place, the cartridge is fitted to the supporting hangers 10. In this movement which involves a slight rotation the cartridge is advanced by the cam slots 11 upwardly so that the filter unit is brought into tight engagement with the sealing head 36. The limit of upward movement of the sealing head is fixed by the coupling nut 40 which stands in spaced but opposed relation to the tubular guide 45. Engagement between the sealing head and the filter unit is confined to a circular line at the high point of the latter, and is enhanced by the spring 47 which exerts a yielding force against the head tending to maintain its contact face tightly against the filter unit.

In the ensuing stage, hot water which is delivered into the cartridge will enter the charge of ground coffee near the bottom and then migrate outwardly and upwardly therethrough. In this operation the coffee grounds are floated upwardly so as to exert a pressure on the under side of the strainer 26 which confines the grounds against escape. Filtered coffee may then pass through the strainer to enter into the enlarged well w in the upper part of the cartridge preliminary to its draining out through the spout 28. The upward pressure exerted on the under side of the filter unit is communicated to the sealing head 36 and to the spring 47 by which this pressure is yieldingly resisted. With each compressive or expansive movement of the spring the duct 31 is required to move correspondingly, but since it is affixed at its distant end to the tank 30 any slight resulting deformation of the duct will be confined largely to its return bend portion 32 which is curved about a radius of substantial length. The axis of the discharge end of the duct, including that of the tubular body of the sealing head, will therefore remain vertically disposed so as not to interfere with free vertical movements of the sealing head in response to pressure of the spring 47.

I claim:

1. In a beverage brewer, a sealing head having an upstanding tubular body and on its under side a contact face, a hot water supply duct affixed at its discharge end to the tubular body of the sealing head, a guide wherein the sealing head and discharge end of the duct are supported for vertical sliding movement, a fixed mounting for the guide, a cartridge including a bowl having at its upper portion an outlet for the discharge of the brewed liquid and removably secured in a fixed position below the sealing head, a centrally apertured filter unit carried by the cartridge in its upper portion below the outlet and separably engaged with the contact face of the sealing head through an endless contact line, and resilient means exerting a downward yielding pressure upon the sealing head to maintain its contact face in pressure engagement with the filter unit whereby to provide a liquid-tight connection at that point.

2. In a beverage brewer, a sealing head having an upstanding tubular body and on its under side a contact face, an upwardly extending hot water duct having a return bend to position its discharge end downwardly, means connecting the tubular body of the sealing head immovably to the duct at its discharge end, a guide wherein the sealing head and discharge end of the duct are supported for vertical sliding movement, a fixed mounting for the guide, a cartridge including a bowl having at its upper portion an outlet for the discharge of the brewed liquid and removably secured below the sealing head, a centrally apertured filter unit carried by the cartridge in its upper portion below the outlet and separably engaged with the contact face of the sealing head through an endless contact line, and resilient means exerting a downward yielding pressure upon the sealing head to maintain its contact face in pressure engagement with the filter unit whereby to provide a liquid-tight connection at that point.

3. In a beverage brewer, a sealing head having an upstanding tubular body and on its under side a contact face, a hot water supply duct having a downwardly facing discharge end, means for fixedly coupling the discharge end of the supply duct to the upper end of the tubular body of the sealing head, a tubular guide surrounding the tubular body of the sealing head to provide a vertical sliding support therefor, the upper end of the tubular guide being normally spaced from the coupling means but, when engaged thereby, serving to limit the downward movement of the sealing head, a fixed mounting for the tubular guide, a cartridge including a bowl having at its upper portion an outlet for the discharge of the brewed liquid and removably secured below the sealing head, a centrally apertured filter unit carried by the cartridge in its upper portion below the outlet and separably engaged with the contact face of the sealing head through an endless contact line, and spring means exerting opposed vertical thrusts on the guide and sealing head to maintain the contact face thereof in pressure engagement with the filter unit whereby to provide a liquid-tight connection at that point.

4. In a beverage brewer, a sealing head having an upstanding tubular body and on its under side a contact face, a hot water supply duct having a downwardly facing discharge end and fixedly mounted at its other end, means for fixedly coupling the discharge end of the supply duct to the upper end of the tubular body of the sealing head, a tubular guide surrounding the tubular body of the sealing head to provide a vertical sliding support therefor, a fixed mounting for the tubular guide, a cartridge including a bowl having at its upper portion an outlet for the discharge of the brewed liquid and removably secured in a fixed position below the sealing head, a centrally apertured filter unit carried by the cartridge in its upper portion below the outlet and separably engaged with the contact face of the sealing head through an endless contact line, and spring means exerting opposed vertical thrusts on the guide and sealing head to maintain the contact face thereof in pressure engagement with the filter unit whereby to provide a liquid-tight connection at that point.

5. In a beverage brewer, a sealing head having an upstanding tubular body and on its underside a contact face, a fixedly mounted upwardly extending hot water supply duct having a return bend to position its discharge end downwardly, means connecting the tubular body of the sealing head immovably to the duct at its discharge end, a tubular guide surrounding the tubular body of the sealing head to provide a vertical sliding support therefor and for the discharge end of the duct, a fixed mounting for the tubular guide, a cartridge including a bowl having at its upper portion an outlet for the discharge of the brewed liquid and removably secured in a fixed position below the sealing head, a centrally apertured filter unit carried by the cartridge in its upper portion below the outlet and separably engaged with the contact face of the sealing head through an endless contact line, and spring means exerting opposed vertical thrusts on the guide and sealing head to maintain the contact face thereof in pressure engagement with the filter unit whereby to provide a liquid-tight connection at that point.

6. In a beverage brewer, an upstanding tubular body having at its lower end a sealing head with a contact face at its underside and provided with an upwardly facing channel, a fixedly mounted hot water supply duct having a downwardly facing discharge end, means for fixedly coupling the upper end of the tubular body to the discharge end of the supply duct, a tubular guide surrounding the tubular body and normally spaced from the coupling means but, when engaged thereby, serving to limit the downward movement of the sealing head, said tubular guide having a downwardly facing channel telescoping the upwardly facing channel of the sealing head, a fixed mounting for the tubular guide, a cartridge including a bowl having at its upper portion and outlet for the discharge of the brewed liquid and removably secured in a fixed position below the sealing head, a centrally apertured filter unit carried by the cartridge in the upper portion thereof and separately engaged with the contact face of the sealing head through an endless contact line, and spring means located in said channels and exerting opposed vertical thrusts on the guide and the sealing head to maintain the contact face thereof in pressure engagement with the filter unit whereby to provide a liquid-tight connection at that point.

7. In a beverage brewer, an upstanding tubular body having at its lower end a sealing head with a contact face at its underside and provided with an upwardly facing channel, a fixedly mounted hot water supply duct having a downwardly facing discharge end, means for fixedly coupling the upper end of the tubular body to the discharge end of the supply duct, a tubular guide surrounding the tubular body and normally spaced from the coupling means but, when engaged thereby, serving to limit the downward movement of the sealing head, said tubular guide having a downwardly facing channel telescoping the upwardly facing channel of the sealing head, a truncated conical supporting wall centrally apertured to receive the tubular guide and rigidly secured to the same, said wall having a fixed mounting at its peripheral portion, a cartridge including a bowl having at its upper portion an outlet for the discharge of the brewed liquid and removably secured in a fixed position below the sealing head, the upper portion of the cartridge being spaced from said supporting wall and of approximately the same diameter as said wall, a centrally apertured filter unit carried by the cartridge in the upper portion thereof and separately engaged with the contact face of the sealing head through an endless contact line, and spring means located within said channels and exerting opposed vertical thrusts on the guide and sealing head to maintain the contact face thereof in pressure engagement with the filter unit whereby to provide a liquid-tight connection at that point.

HARVEY R. KARLEN.

REFERENCES CITED

The following references are of record in the file of this patent:

UNITED STATES PATENTS

| Number | Name | Date |
| --- | --- | --- |
| 411,920 | Hoeder | Oct. 1, 1889 |
| 1,467,778 | Paola | Sept. 11, 1923 |
| 2,454,030 | Besore | Nov. 16, 1948 |
| 2,484,054 | Sharp | Oct. 11, 1949 |

FOREIGN PATENTS

| Number | Country | Date |
| --- | --- | --- |
| 457,264 | France | Apr. 30, 1913 |